Sept. 13, 1955    R. LEDUC    2,717,579
CONTROL APPARATUS

Filed Oct. 9, 1951    2 Sheets-Sheet 1

INVENTOR:
RENÉ LEDUC
BY:

Sept. 13, 1955          R. LEDUC          2,717,579

CONTROL APPARATUS

Filed Oct. 9, 1951          2 Sheets-Sheet 2

INVENTOR:
RENÉ LEDUC

United States Patent Office 2,717,579
Patented Sept. 13, 1955

2,717,579

CONTROL APPARATUS

René Leduc, Toulouse, France

Application October 9, 1951, Serial No. 250,453

Claims priority, application France February 28, 1947

5 Claims. (Cl. 121—41)

The present invention relates to a control apparatus for interconnecting a controlling member with a controlled member.

More particularly, the present invention relates to a control apparatus adapted to be operated by fluid pressure and to a means for locking a controlling member to a controlled member when the fluid pressure falls below a predetermined limit, so that the device will not become inoperative in this latter event.

The present application is a continuation-in-part of U. S. application Serial No. 10,060, filed February 21, 1948, and entitled "Control Systems," now U. S. Patent No. 2,574,335, dated November 6, 1951.

One of the objects of the present invention is to provide a control apparatus of the above type which is of an exceedingly simple and efficient construction and permits the controlled member to be actuated with a minimum of force applied to the controlling member.

Another object of the present invention is to feed back a portion of the fluid pressure to the controlling member to give the operator an indication of the resistance encountered in the actuation of the control apparatus.

A further object of the present invention is to provide a means for rendering the device operative even after the fluid pressure falls below a predetermined limit required for normal operation.

An additional object of the present invention is to provide a means for short-circuiting the flow of fluid in the apparatus when the fluid pressure falls below a predetermined limit so as to nullify the effect of fluid pressure in the latter event.

With the above objects in view, the present invention mainly consists of a piston adapted to be connected to a controlled member and located within a cylinder so that the piston and cylinder are mounted for movement with respect to each other. A supply conduit means supplies fluid to one side of the piston, and a discharge conduit means discharges fluid from an opposite side of the piston. A first ball valve means is mounted in the piston to control the flow of fluid between the opposite sides thereof, and a second ball valve means is mounted in the discharge conduit means to control the flow of fluid from the opposite side of the piston. An actuating member engages the first and second ball valve means and is mounted for reciprocating movement so as to open one of said ball valve means upon movement in one direction and the other of said ball valve means upon movement in an opposite direction. This actuating member is adapted to be connected to a controlling member so that the actuating member is moved upon movement of the controlling member. Thus, when the first ball valve means is open fluid will flow from one side of the piston to said opposite side thereof so as to move the piston in one direction in the cylinder, and, when the second ball valve means is open, fluid will flow from the opposite side of the piston so that fluid pressure will move the piston in an opposite direction in the cylinder. This movement of the piston causes corresponding movements in the member to be controlled. Locking means, responsive to the fluid pressure, is located between the piston and controlling member for interconnecting the same when the fluid pressure falls below a predetermined limit, and a short circuit means, also responsive to the fluid pressure, is located between the supply and discharge conduit means for interconnecting the latter when the fluid pressure falls below the predetermined limit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
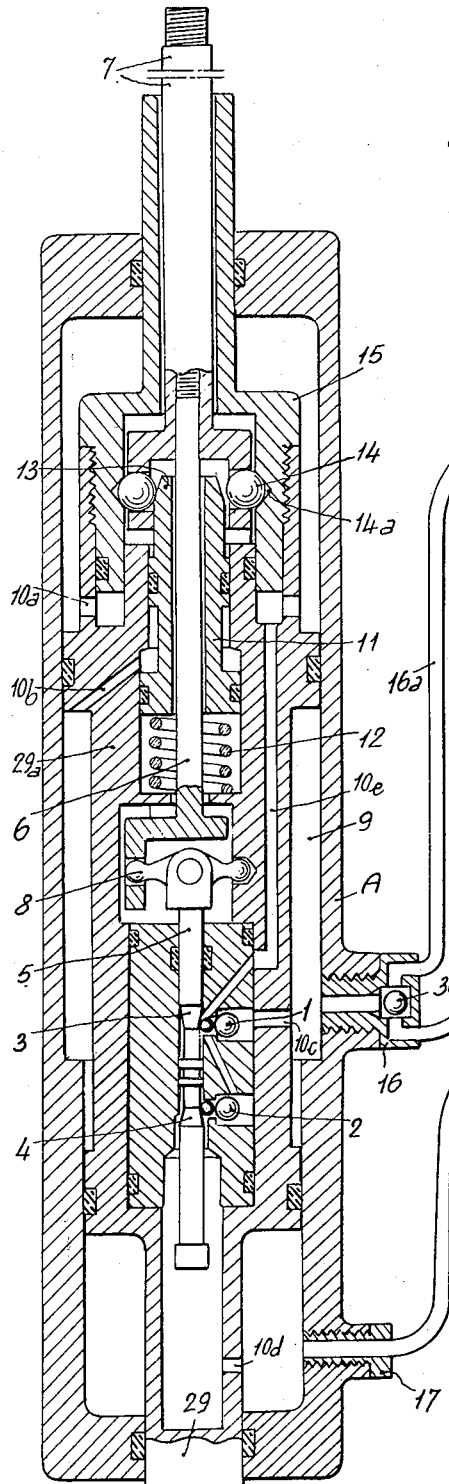
Fig. 1 shows a longitudinal, partially sectional, schematic view of one possible apparatus for carrying out the present invention.

Referring now to the drawings, there is shown a cylinder A having opposite end walls and having a first interior portion, adjacent to the lower end wall as viewed in Fig. 1, which is of a smaller diameter than a second interior cylinder portion extending from the first interior portion to the upper cylinder and wall shown in Fig. 1.

Mounted in the cylinder A for sliding movement therein is the piston means 15 which has a pair of opposite end extensions respectively extending slidably through the opposite end walls of the cylinder A. These end extensions of the piston means 15 are bored, the upper end extension, as viewed in Fig. 1, having an open end and the lower end extension 29 having a closed end. These opposite end extensions are of the same diameter, and the piston means 15 has a first portion, adjacent the upper end extension, which is of a larger diameter than this latter end extension and of a smaller diameter than the second interior portion of the cylinder A, a second annular portion next to the first portion and slidably engaging the interior wall of the second portion of cylinder A, a third portion of a smaller diameter than the first interior portion of cylinder A and extending from the second annular portion of the piston into the first interior portion of the cylinder, and a fourth annular portion next to the third portion, and slidably engaging the first interior portion of the cylinder. The piston means 15 is provided with an interior chamber extending between the bores of the end extensions. The piston means 15 is formed with a first bore 10a, a second bore 10b, a third bore 10c and a fourth bore 10d. The bore 10a communicates with a passage 10e located outside of the chamber extending through the piston means 15, this passage communicating with a ball valve means 1 which in turn communicates with the bore 10c so that the ball valve means 1 controls the flow of fluid between passage 10e and bore 10c. A second ball valve 2 communicates through a bore of piston means 15 with ball valve means 1, and with the bore 10d through the bore of extension 29.

Figure 3:
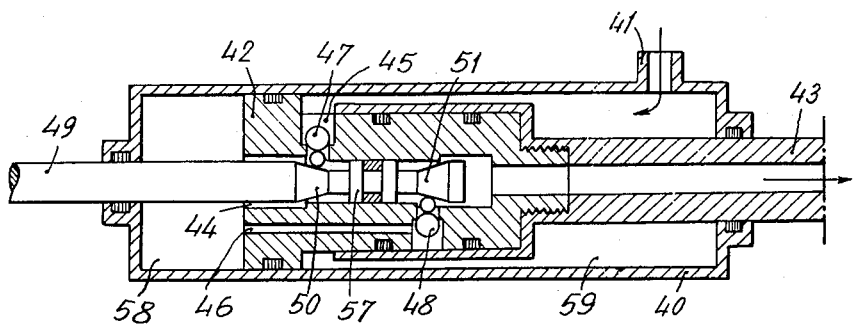
Fig. 3 is a partially sectional view of a different embodiment of the present invention.

The piston means 15 has a member mounted therein for supporting the ball valve means 1 and 2 and for slidably supporting the elongated actuating member 5 for movement in piston means 15, this actuating member 5 having a pair of oppositely inclined conical surface portions 3 and 4 which respectively engage the ball valve means 1 and 2 so as to open the ball valve means 2 when the member 5 is moved upwardly, as viewed in Fig. 1, and so as to open the ball valve means 1 when the member 5 is moved downwardly, as viewed in Fig. 1. The details of the ball valve means 1 and 2 are the same as the ball valve means of Fig. 3 and will be described in further detail when Fig. 3 is described. The member 5 is formed with a central piston portion located between the inclined surface portions 3 and 4 for sealing off these inclined surface portions from each other, this central piston position of member 5 slidably engaging the member in which actuating member 5 is mounted.

A lever 8 is pivotally connected at an intermediate part thereof with the upper end of member 5, as viewed in Fig. 1, one end of the lever 8 pivotally engaging a recess in the interior chamber of piston means 15, as shown in Fig. 1, and the other end of the lever 8 engaging the lower end of the angular portion of the elongated member 6 which extends through a bore in a floor of the chamber in piston means 15 and is threadedly connected at its upper end to the controlling member 7 of the control apparatus, this member 7 having a cage, on the lower end thereof, located adjacent to the groove 14a formed in the wall of the chamber of the piston means 15. A plurality of ball members 14 are mounted in apertures of the cage of controlling member 7 and are located adjacent to the groove 14.

An elongated sleeve member 11 is located about the member 6 and has an upper conical end portion 13 located adjacent to the ball members 14 to maintain the same in the apertures of the cage of member 7, this elongated sleeve member 11 having a pair of spaced annular portions slidably engaging the interior wall of the chamber in piston means 15 and being located respectively on opposite sides of the bore 10b. A coil spring 12 is located about the member 6 and abuts with one end thereof against the apertured floor of the interior chamber of piston means 15 and with the other end thereof against the sleeve member 11. It will be noted from Fig. 1 that the member 7 is mounted with clearance in the upper extension of piston means 15 and that the sleeve member 11 is mounted with clearance about the member 6 so that in this way the members 8, 6, 12 and 7 are subject to atmospheric pressure while being located within the piston means 15 that is surrounded with fluid, as will be described below.

A supply conduit means 16 is connected to the cylinder A for supplying fluid under pressure to the space 9 between piston means 15 and cylinder A, this fluid flowing through the bore 10b to the space between the pair of annular portions of sleeve member 11 so as to act against spring 12 and compress the same. In this way the fluid pressure lowers the conical end 13 of sleeve 11 with respect to the ball members 14 so that the latter are not urged into the annular groove 14a, and in this way the members 6 and 7 are free to move with respect to the piston means 15 so as to move member 5 and actuate the ball valve members 1 or 2. When the ball valve means 1 is open, the fluid flows through the bore 10c, through the ball valve means 1, through the passage 10e, and through the bore 10a to surround the upper part of piston means 15, as viewed in Fig. 1.

A discharge conduit means 17 is connected to the first interior portion of cylinder A opposite the extension 29 of piston means 15 for discharging fluid surrounding the extension 29 and passing through the bore 10d from the valve means 2, when the latter is open. Ball valve means 1 is so constructed that fluid may flow around the smaller ball member thereof even when ball valve means 1 is in its closed position, so that the passage 10e is always in communication with ball valve means 2 as well as ball valve means 1.

The conduit means 16 comprises the separate lines 16a and 16b which have the ball member 30 located between the same at one end thereof and ball member 28 located between the same at the opposite end thereof, this ball member 28 being maintained between the lines 16a and 16b by a coil spring, as shown in Fig. 1. The purpose of this coil spring will be described more fully below. The lines 16a and 16b communicate with the bore 18 of the short circuiting device T, this bore 18 leading to chamber 19 in which the valve member 32 is mounted for sliding movement and is urged downwardly, as viewed in Fig. 1, by the spring 33 bearing against the end of valve 32 so that the conical end 25 of valve member 32 is urged by spring 33 toward the valve seat 24 formed on the upper end of member 22 which is longitudinally and transversely bored and formed as a piston adjacent the lower end thereof, as viewed in Fig. 1. Spring 23 engages the member 22 to urge the same downwardly, as viewed in Fig. 1, and discharge conduit means 17 communicates with bore 21 leading across the space about the member 22. The lines 16a and 16b are supplied by the lines 31a and 31b which have the ball member 27 located therebetween. The device T is shown in a short circuiting position in Fig. 1 and in its normal position of operation in Fig. 2.

The ball members 27, 28 and 30 are safety devices, the ball members 28 and 30 serving to automatically close off one of the lines 16a or 16b when the pressure falls therein, due to a leak for example, so that the other of the lines will continue to function by itself. The purpose of the spring bearing against ball member 28 is to prevent it from blocking the passage 18. The ball member 27 and another ball member (not shown) function in the same way with respect to lines 31a and 31b as the ball members 28 and 30 function with respect to lines 16a and 16b.

Figure 2:
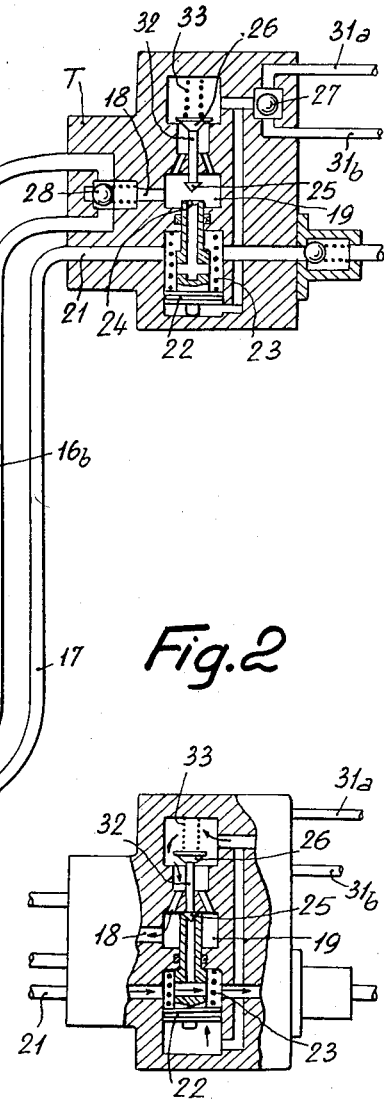
Fig. 2 shows a part of the structure of Fig. 1 in a different position thereof.

The above described apparatus operates as follows:

When the fluid pressure in the device is above a predetermined value, which value may be set by proper choice of springs 23 and 12, the pressure in the fluid will act on the piston part of member 23 to raise the same, as shown in Fig. 2, so that the seat 24 engages the conical end 25 of member 32 and raises the latter against the action of spring 33, as shown in Fig. 2. The supply and discharge conduit means 16 and 17 are then separated from each other so that the fluid flows from lines 31a and 31b to the bore 18 and conduit means 16 to enter the cylinder A and from the cylinder A through the discharge conduit means 17 and bored member 22 to a collecting tank for example, from where the fluid is again pumped to the lines 31a and 31b so as to maintain the fluid in the device at the above mentioned predetermined pressure.

Assuming that, during the normal operation of the device, it is desired to move extension 29 downwardly, as viewed in Fig. 1, in order to impart a corresponding movement to an element to be controlled, then the controlling member 7 is moved downwardly, as viewed in Fig. 1, so as to pivot the lever 8 in a counter-clockwise direction, as viewed in Fig. 1, about the right hand end of lever 8, as viewed in Fig. 1, to impart a corresponding downward movement to the member 5. The lever 8 is preferably designed so as to impart to the member 5 one-half of the movement of member 7. Upon downward movement of the member 5, the inclined surface portion 3 will bear against the smaller ball member of ball valve means 1 so as to thereby move the large ball member thereof away from its seat so that the ball valve means 1 is then in its open position and ball valve means 2 remains closed. Since ball valve means 2 is closed, fluid cannot flow to the discharge conduit means 17, and the fluid can therefore only flow through the ball valve means 1, passage 10e and bore 10a to the area around the upper part of piston means 15. Since the effective area of this upper part of piston means 15 is much greater than the effective piston area in space 9, the fluid pressure will lower the piston means 15 with respect to the cylinder A and thereby impart a downward movement to extension 29 when the member 7 is moved downwardly, as viewed in Fig. 1, the fluid then flowing as described above. It will be noted that the movement of member 7 is in no way resisted by the fluid pressure and is entirely independent thereof so that the device is easy to operate.

As was mentioned above, during the normal operation of the apparatus, fluid pressure of space 9 communicates through bore 10b with the sleeve member 11 to urge the same against the action of spring 12 and maintain the latter in compressed condition, the space in which this spring 12 is located being open to the atmosphere.

If it is desired to move the extension 29 in an upward direction, as viewed in Fig. 1, in order to impart a corresponding movement to a controlled element connected to extension 29, the member 7 is moved upwardly with respect to the piston means 15 to impart a corresponding upward movement to member 5 and thereby open valve means 2 while maintaining valve means 1 in its closed position. When the valve means 2 is open, it places the fluid around the upper part of piston means 15 in communication with the discharge conduit means by way of the bore 10a, passage 10e, the space around the smaller ball member of valve means 1, the open valve means 2, the bore of extension 29, and the bore of 10d. The pressure in the discharge conduit means 17 is negligible as compared to the pressure in the supply conduit means 16 and space 9 so that this latter pressure acting against the lower face of the above-mentioned second annular portion of piston means 15 moves piston means 15 upwardly with respect to cylinder A, as viewed in Fig. 1, and forces the fluid from the upper part of the piston means 15 out through the discharge conduit means 17 by the above-mentioned path. In this way, when the controlling element 7 is moved upwardly, as viewed in Fig. 1, a corresponding movement is imparted to extension 29 and a controlled element connected thereto. Of course, it is obvious that when the movement of member 7 in either of its directions has been terminated, the fluid pressure automatically will move the piston means 15 with respect to the member 7 until the equilibrium position where both valve means 1 and 2 are closed is again obtained.

Assuming now that for some reason, such as for example a leak in the lines, the fluid pressure falls below the above-mentioned predetermined limit, then the spring 23 will move the member 22 from the position shown in Fig. 2 to the position shown in Fig. 1 so that the supply and discharge conduit means 16 and 17 are short-circuited. Also, due to the fall in pressure, the spring 12 will move the sleeve member 11 upwardly, as viewed in Fig. 1, so that the conical end portion 13 thereof urges the ball members 14 into the annular groove 14a and maintains the ball members 14 in this position so that the member 7 is mechanically connected to the piston means 15 when the fluid pressure falls below this predetermined limit. There is thus automatically formed a mechanical linkage between the controlling and controlled element when the fluid pressure falls below a predetermined limit, and the entire device is still operative although it no longer operates by fluid pressure. This feature is of extremely great merit when one considers for example a control device mounted in an aeroplane which would be rendered difficult to operate upon the failure in the fluid lines. By the above-mentioned structure the pilot of an aeroplane, for example, may still effectively control the same even when the fluid pressure falls below a predetermined limit. Without such an automatic locking device, there would be extremely great play in the valve members, because these are designed to open to a relatively large extent to permit maneuvering of the aeroplane during normal operations thereof, and this great play in the valve members would render the control of the aeroplane very difficult. This latter disadvantage is entirely eliminated by the above-described locking apparatus.

When the fluid pressure is below the predetermined pressure limit and member 7 is locked to piston means 15, as described above, the fluid pressure does not urge the valve members 1 and 2 into either their closed or open positions and they may be easily moved into or from either position. Assuming, with the parts in this position, that it is desired to move extension 29 downwardly, as viewed in Fig. 1, then the member 7 is moved downwardly to move the entire piston means 15 and extension 29 downwardly therewith. During such movement the third portion of piston means 15 moves further into the first interior portion of cylinder A so that the volume of space 9 is decreased and fluid is forced from space 9 through conduit means 16, through bore 18, member 22, bore 21 and conduit means 17 into the lower part of cylinder A. The fluid entering the lower part of cylinder A flows through the bore 10d, opens the valve means 2 and flows to the upper part of piston means 15. The valve means 1 and 2 do not in any way resist the flow of fluid at this time.

If it is desired to move extension 29 upwardly, with the fluid pressure below the predetermined pressure limit and element 7 locked to piston means 15, element 7 is simply moved upwardly to carry piston means 15 and extension 29 along therewith, the fluid flowing from the upper part of piston means 15, through bore 10a, passage 10e and valve means 1 to the conduit means 16 through the short circuit device T, and through the conduit means 17 to the lower part of cylinder A.

Thus, when the fluid pressure falls below the above-mentioned predetermined limit, the flow of fluid in the conduit means 16 and 17 is just the reverse of that prevailing during normal operation. As soon as the normal pressure is again restored to the fluid, it will raise the member 22 to the position shown in Fig. 2 and compress the spring 12 to automatically unlock member 7 from piston means 15 and the device will again operate normally in the manner described above.

Figure 4:
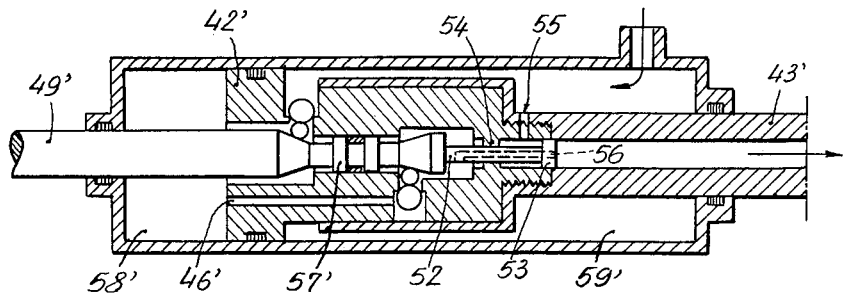
Fig. 4 is a partially sectional view of still another embodiment of the present invention.

Figs. 3 and 4 respectively show two other embodiments of a control apparatus. In Fig. 3 there is shown cylinder 40 provided with the conduit 41 for supplying fluid to one side of the piston 42 mounted for sliding movement in the cylinder 40 and having the hollow piston rod 43 connected thereto and extending through one end wall of the cylinder 40. Piston 42 is formed with a central bore 44 communicating with the hollow connecting rod 43, with a second bore 45 communicating with one part of the central bore 44 and the right side of piston 42, as viewed in Fig. 3, and with a third bore 46 extending from the opposite side of piston 42 to another part of the central bore 44, this third bore 46 cooperating with the hollow piston rod 43 to form a discharge conduit means for carrying fluid away from the left hand side of piston 42, as viewed in Fig. 3. Mounted in the bores 45 and 46 are a pair of ball valve means, respectively, which include the ball member 47 mounted on a valve seat formed in bore 45 and the ball member 48 mounted on a valve seat formed in the bore 46, each of the valve means also having a ball member of a smaller size than the ball members 47 and 48, being located against the same, and extending at least partially into the central bore 44 of piston 42.

An elongated actuating member 49 slidably extends through the left end wall of cylinder 40, as viewed in Fig. 3, and has a pair of oppositely inclined conical surface portions 50 and 51 respectively associated with the two ball valve means located in bores 45 and 46. Actuating member 49 is formed with a piston portion located between the surface portions 50 and 51 and slidably engaging the central bore 44 of piston 42. The actuating member 49 is adapted to have a controlling member connected thereto, and piston rod 43 is adapted to have a controlled element connected thereto.

If the member 49 is moved to the right, as viewed in Fig. 3, the ball member 47 will be raised off its seat so that fluid may flow from the right hand side of piston 42 to the left hand side thereof, as viewed in Fig. 3. Since the left hand side of piston 42, as viewed in Fig. 3, has a greater effective area than the right side thereof, the pressure on this left side of piston 42 displaces piston 42 to the right, as viewed in Fig. 3, and the fluid on the right hand side of piston 42 flows through the same. If, on the other hand, the piston 49 is moved to the left, as viewed in Fig. 3, the ball member 48 will be raised off its seat, while ball member 47 remains on its seat and the discharge line will then be open. Since the discharge pressure is negligible, the fluid pressure on the right side of piston 42 will move the piston to the left, as viewed in Fig. 3, and force fluid from the left side of piston 42 out through bore 46 and hollow piston rod 43. The above operations take place until the fluid pressure automatically moves the piston with respect to the member 49 so that both ball members 47 and 48 are seated.

The ball valve structure described above in connection with Fig. 3 is exactly the same as the ball valve structure illustrated in Fig. 1 and is an extremely simple and inexpensive structure for efficiently controlling the fluid flow since it is much easier to provide a seal by a ball and seat therefor than by a slidable cover member, for example.

In the structure of Figure 3 the diameter of the piston portion 57 is equal to the diameter of the actuating member 49 and since the right hand face of the piston portion 57 is always under exhaust pressure (which may be taken as negligible compared with the supply pressure) the piston portion 57 and the actuating member 49 are at all times in equilibrium with respect to the applied fluid pressure. Consequently the effort exerted by the motive fluid on piston 42, for displacement in either direction, is completely independent of the effort exerted on the actuating element 49 which is directed solely by the friction to overcome.

The structure of Figure 4 is a modified form of the device of Figure 3 adapted to give the operator an indication of the resistance which is to be overcome by the controlled element.

The structure of Figure 4 is the same as the structure of Figure 3 except that:

(a) An extension 52 extends from the end of actuating member 49' and terminates in a piston portion 53 which engages the interior of the hollow piston rod 43', this hollow piston rod 43' being formed with an annular shoulder portion 54 which slidably engages the extension 52.

The hollow connecting rod 43' is formed with a bore 55 located between the piston 53 and annular shoulder 54. Also, the extension 52 is formed with a bore 56 extending therethrough and communicating with the opposite side of annular shoulder 54 from piston portion 53 and with the hollow connecting rod 43'. Thus, this bore 56 provides a communication between the bore 46' and the hollow connecting rod 43' so that the fluid may discharge from the left side of piston 42', as viewed in Figure 4, but on the other hand, fluid pressure is constantly acting against the left hand surface of piston portion 53, as viewed in Figure 4, through the medium of bore 55.

(b) The piston portion 57' is of smaller diameter than the actuating member 49'.

As a result of this arrangement the fluid pressure acts in opposite directions on the left hand side of piston 53 and on the actuating member 49', due to the difference in diameters of said actuating member 49' and the piston portion 57'.

The respective dimensions of the areas on which the fluid pressure is applied will be calculated in order to give to the resultant effort, which will be "feeled" by the operator on the actuating member 49', a given fractional value of the resistance exerted on the controlled member, in either direction of movement of the controlling or controlled member.

To that effect the effective area of the actuating member 49' exposed to the fluid pressure will be given in either side of the piston 42' any chosen fractional value with respect to the effective area of the controlled member 42', 43' exposed to the fluid pressure. On the left hand side of piston 42' such effective area of the actuating member 49' exposed to the fluid pressure is determined by the difference in diameter of said actuating member 49' and the piston portion 57' and the effective area of the controlled member 43', 42' is determined by the annular area of piston 42' exposed to the fluid pressure in space 58'. On the right hand side of piston 42' the effective area of the actuating member 49' exposed to the fluid pressure is the annular area of piston portion 53 around the rod 52 and the effective area of the controlled member 43', 42' is the annular area of piston 42' exposed to the fluid pressure in space 59' plus the area of the annular shoulder portion 54 (which area is equal to that of the annular area of piston 53 around rod 52). Since the said effective areas on the member 49' may be chosen as small as desired, only a small pressure may be transmitted to the member 49', but this pressure is sufficient to give the operator an indication of the resistance to the movement of the controlled element, and this "feel" may be desirable when the device of the invention is used in an aeroplane, for example. Thus, the embodiment of Figure 4 sends back to the operator a part of the fluid pressure in the cylinder so as to give the operator a sense of "feel."

The embodiment of Fig. 4 operates in exactly the same manner as Fig. 3, except that the discharging fluid flows from bore 46' through bore 56 to the hollow piston rod 43'.

It will be understood that each of the elements described above, or two or more together, may also find a useful application in other types of control apparatus and locking means therefor differing from the types described above.

While the invention has been illustrated and described as embodied in a control apparatus and means for mechanically locking the same when fluid pressure therein falls below a predetermined limit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a control apparatus, in combination, a cylinder having a pair of opposite end walls and being formed with an opening adjacent one of said end walls; a piston mounted for movement within said cylinder so that fluid may be supplied to one side of said piston through said cylinder opening, said piston being formed with a central bore passing therethrough, a second bore leading from said one side of said piston to one part of said central bore, and a third bore leading from an opposite side of said piston to another part of said central bore; a hollow piston rod connecting to said piston and communicating with said central bore, said piston rod extending through said one end wall of said cylinder; first ball valve means mounted in said second bore; second ball valve means mounted in said third bore, said first and second ball valve means each comprising a valve seat; a first ball member engaging said valve seat, and a second ball member of a smaller size than said first ball member, being located against the same, and extending at least partially into said central bore; and an elongated rod member passing through the other of said end walls of said cylinder with a section equal to that of the said central bore and having an end section provided with a portion slidably engaging said central bore between said parts thereof and being of a smaller size than said central bore on opposite side of said portion, said opposite sides of said end section of said rod member being formed with a pair of oppositely inclined surface portions which respectively engage said second ball members of said first and second ball valve means for opening said first ball valve means upon movement of said rod member toward said one end wall of said cylinder and for opening said second ball valve means upon movement of said rod member toward said other end wall of said cylinder, whereby, when said first ball valve means is open, fluid pressure moves said piston toward said one end wall of said cylinder, and whereby, when said second ball valve means is open, fluid pressure moves said piston toward said other end wall of said cylinder.

2. In a control apparatus, in combination, a cylinder having a pair of opposite end walls and being formed with an opening adjacent one of said end walls; a piston mounted for movement within said cylinder so that fluid may be supplied to one side of said piston through said cylinder opening, said piston being formed with a central bore passing therethrough, a second bore leading from said one side of said piston to one part of said central bore, a third bore leading from an opposite side of said piston to another part of said central bore, and a fourth bore leading from said one side of said piston to a third part of said central bore; a hollow piston rod connecting to said piston and communicating with said central bore, said piston rod extending through said one end wall of said cylinder and being formed with an annular shoulder located between said other and third parts of said central bore; first ball valve means mounted in said second bore; second ball valve means mounted in said third bore; and an elongated rod member passing through the other of said end walls of said cylinder and having an end section provided with a portion slidably engaging said central bore between said one and said other parts thereof and being of a smaller size than said central bore on opposite sides of said portion, said opposite sides of said end section of said rod member being formed with a pair of oppositely inclined surface portions which respectively engage said first and second ball valve means for opening said first ball valve means upon movement of said rod member toward said one end wall of said cylinder and for opening said second ball valve means upon movement of said rod member toward said other end wall of said cylinder, whereby, when said first ball valve means is open, fluid pressure moves said piston toward said one end wall of said cylinder, and whereby, when said second ball valve means is open, fluid pressure moves said piston toward said other end wall of said cylinder, said elongated rod member having an extension extending from said end section thereof, slidably engaging said annular shoulder and having a second piston slidably engaging the interior of said hollow piston rod on the opposite side of said third part of said central bore from said other part thereof, said extension being formed with a bore passing through said second piston and communicating with said central bore on the opposite side of said annular shoulder from said second piston.

3. In a control apparatus, in combination, a cylinder having a pair of opposite end walls and being formed with an opening adjacent one of said end walls; a piston mounted for movement within said cylinder so that fluid may be supplied to one side of said piston through said cylinder opening, said piston being formed with a central bore passing therethrough, a second bore leading from said one side of said piston to one part of said central bore, a third bore leading from an opposite side of said piston to another part of said central bore, and a fourth bore leading from said one side of said piston to a third part of said central bore; a hollow piston rod connecting to said piston and communicating with said central bore, said piston rod extending through said one end wall of said cylinder and being formed with an annular shoulder located between said other and third parts of said central bore; first ball valve means mounted in said second bore; second ball valve means mounted in said third bore, said first and second ball valve means each comprising a valve seat, a first ball member engaging said valve seat, and a second ball member of a smaller size than said first ball member, being located against the same, and extending at least partially into said central bore; and an elongated rod member passing through the other of said end walls of said cylinder with a greater diameter than that of said central bore and having an end section provided with a portion slidably engaging said central bore between said one and said other parts thereof and being of a smaller size than said central bore on opposite sides of said portion, said opposite sides of said end section of said rod member being formed with a pair of oppositely inclined surface portions which respectively engage said second ball members of said first and second ball valve means for opening said first ball valve means upon movement of said rod member toward said one end wall of said cylinder and for opening said second ball valve means upon movement of said rod member toward said other end wall of said cylinder, whereby, when said first ball valve means is open, fluid pressure moves said piston toward said one end wall of said cylinder, and whereby, when said second ball valve means is open, fluid pressure moves said piston toward said other end wall of said cylinder, said elongated rod member having an extension extending from said end section thereof, slidably engaging said anular shoulder and having a second piston slidably engaging the interior of said hollow piston rod on the opposite side of said third part of said central bore from said other part thereof, said extension being formed with a bore passing through said second piston and communicating with said central bore on the opposite side of said annular shoulder from said second piston.

4. In a control apparatus, in combination, a cylinder having a pair of opposite end walls and being formed with an opening adjacent one of said end walls; a piston mounted for movement within said cylinder so that fluid may be supplied to one side of said piston through said cylinder opening, said piston being formed with a central bore passing therethrough, a second bore leading from said one side of said piston to one part of said central bore, a third bore leading from an opposite side of said piston to another part of said central bore, and a fourth bore leading from said one side of said piston to a third part of said central bore; a hollow piston rod connecting to said piston and communicating with said central bore, said piston rod extending through said one end wall of said cylinder and being formed with an annular shoulder located between said other and third parts of said central bore; first ball valve means mounted in said second bore; second ball valve means mounted in said third bore, said first and second ball valve means each comprising a valve seat, a first ball member engaging said valve seat, and a second ball member of a smaller size than said first ball member, being located against the same, and extending at least partially into said central bore; and an elongated rod member passing through the other of said end walls of said cylinder with a greater diameter than that of said central bore and having an end section provided with a portion slidably engaging said central bore between said one and said other parts thereof and being of a smaller size than said central bore on opposite sides of said portion, said opposite sides of said end section of said rod member being formed with a pair of oppositely inclined surface portions which respectively engage said second ball members of said first and second ball valve means for opening said first ball valve means upon movement of said rod member toward said one end wall of said cylinder and for opening said second ball valve means upon movement of said rod member toward said other end wall of said cylinder, whereby, when said first ball valve means is open, fluid pressure moves said piston toward said one end wall of said cylinder, and whereby, when said second ball valve means is open, fluid pressure moves said piston toward said other end wall of said cylinder, said elongated rod member having an extension extending from said end section thereof, slidably engaging said annular shoulder and having a second piston slidably engaging the interior of said hollow piston rod on the opposite side of said third part of said central bore from said other part thereof, said extension being formed with a bore passing through said second piston and communicating with said central bore on the opposite side of said annular shoulder from said second piston, the effective areas of the elongated rod member which are exposed to the fluid pressure in the right hand side and in the left hand side of the piston in the cylinder being the same fractional value of the effective areas of the said piston which are exposed to the fluid pressure in the right hand side and in the left hand side of said piston in the cylinder.

5. In a control apparatus, in combination, a cylinder having a pair of opposite end walls and being formed with an opening adjacent one of said end walls; a piston mounted for movement within said cylinder so that fluid may be supplied to one side of said piston through said cylinder opening, said piston being formed with a central bore passing therethrough, a second bore leading from said one side of said piston to one part of said central bore, and a third bore leading from an opposite side of said piston to another part of said central bore; a hollow piston rod connecting to said piston and communicating with said central bore, said piston rod extending through said one end wall of said cylinder; first ball valve means mounted in said second bore; second ball valve means mounted in said third bore, said first and second ball valve means each comprising a valve seat, a first ball member engaging said valve seat, and a second ball member of a smaller size than said first ball member, being located against the same, and extending at least partially into said central bore; and an elongated rod member passing through the other of said end walls of said cylinder and having an end section provided with a portion slidably engaging said central bore between said parts thereof and being of a smaller size than said central bore on opposite sides of said portion, said opposite sides of said end section of said rod member being formed with a pair of oppositely inclined surface portions which respectively engage said second ball members of said first and second ball valve means for opening said first ball valve means upon movement of said rod member toward said one end wall of said cylinder and for opening said second ball valve means upon movement of said rod member toward said other end wall of said cylinder, whereby, when said first ball valve means is open, fluid pressure moves said piston toward said one end wall of said cylinder, and whereby, when said second ball valve means is open, fluid pressure moves said piston toward said other end wall of said cylinder.

References Cited in the file of this patent

UNITED STATES PATENTS

| | | |
|---|---|---|
| 635,104 | Lunken | Oct. 17, 1899 |
| 796,392 | Bailey | Aug. 1, 1905 |
| 1,028,657 | Aubert | June 4, 1912 |
| 1,573,411 | McKissick | Feb. 16, 1926 |
| 1,666,283 | Farley | Apr. 17, 1928 |
| 2,293,555 | Mercier | Aug. 18, 1942 |
| 2,445,343 | Tyra | July 20, 1948 |
| 2,503,956 | Lisle | Apr. 11, 1950 |
| 2,574,335 | Leduc | Nov. 6, 1951 |
| 2,589,341 | Chisholm | Mar. 18, 1952 |

FOREIGN PATENTS

| | | |
|---|---|---|
| 344,037 | Great Britain | Mar. 2, 1931 |